Patented Mar. 14, 1939

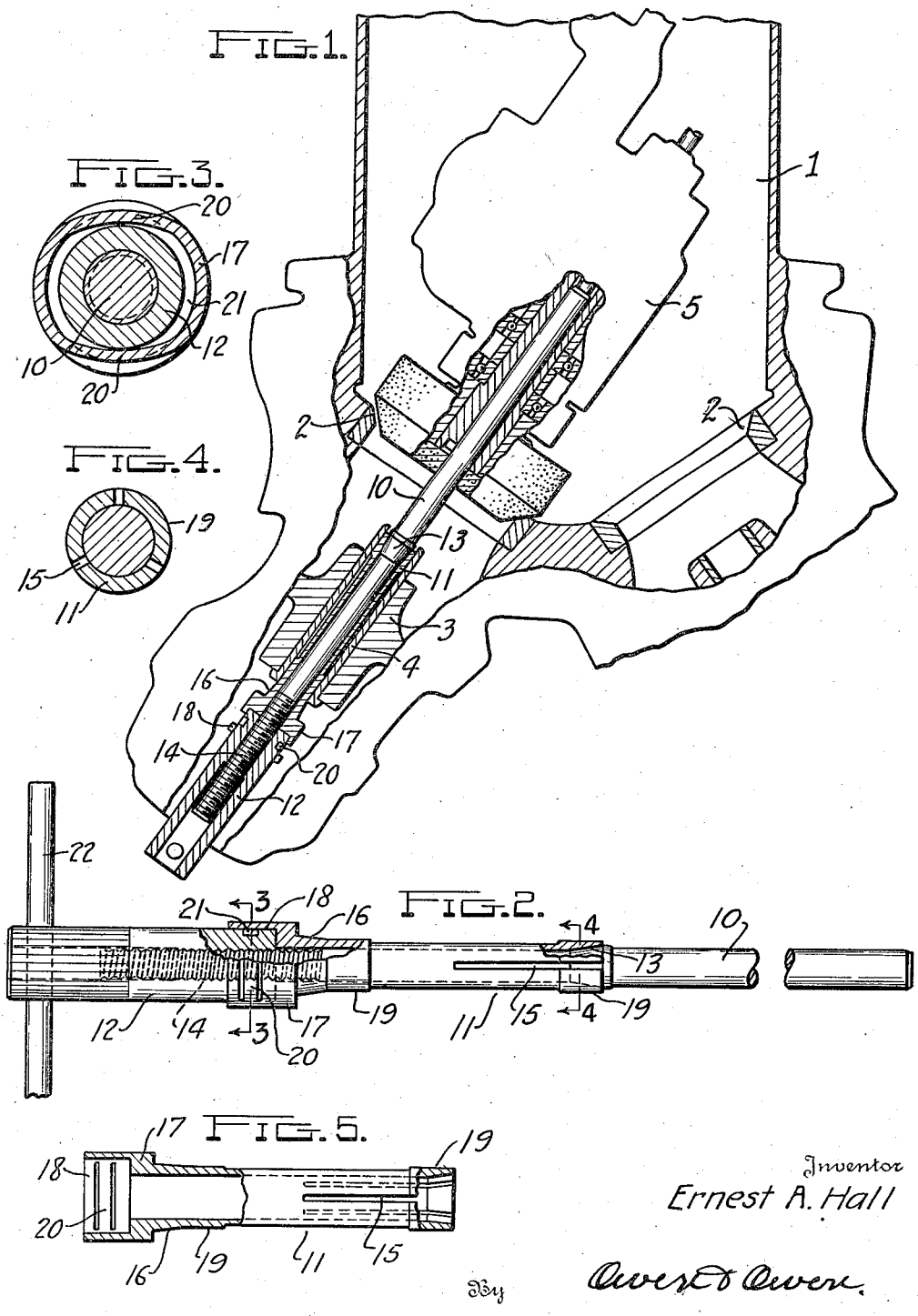

2,150,621

UNITED STATES PATENT OFFICE 2,150,621

PILOT FOR VALVE SEAT FACING TOOLS

Ernest A. Hall, Toledo, Ohio, assignor to The Hall Manufacturing Company, Toledo, Ohio, a corporation of Ohio Application June 3, 1938, Serial No. 211,702

4 Claims. (Cl. 51—241)

This invention relates to grinding or facing means for the valve seats of internal combustion engines, and particularly to a pilot for use in connection with such a means, especially when employed in connection with the valve seats of radial type aeroplane engines, or those having angularly arranged valve seats in the head.

The pilot customarily employed in connection with valve seat grinders are each inserted into a valve stem guide through the valve seat opening from the cylinder side of the guide and then secured from without the guide to center the pilot therein. With engines of the angular seat or radial aeroplane type, this is ordinarily impossible, or at least impractical, due to the length of the pilots and small diameters of the cylinders, and it is therefore necessary to provide a pilot for use in connection with such engines which may be inserted in position through the guide from without the cylinder and then centered therein. Inasmuch as the wear in most valve stem guides is at the ends, it is necessary to grip and center the pilot at both ends of a guide, as well understood in the art, and the adaptation of the ordinary pilot for this purpose prevents its use where positioning through the guide from its outer end, instead of through the cylinder, is necessary.

The object of the present invention is to provide a pilot of the class described which is adapted to be inserted in position through a valve stem guide from its outer end and has simple and efficient means for fixedly mounting the pilot in centered position therein.

The invention is fully described in the following specification, and one embodiment thereof illustrated in the accompanying drawing, in which—

Figure 1 is a fragmentary side elevation of an angular seat aeroplane engine cylinder, with a pilot embodying the invention mounted in operative position therein and being partly in central longitudinal section, and with a valve seat grinder mounted on the pilot, with a part broken away;

Fig. 2 is an enlarged side view of a pilot embodying the invention, with parts broken away; Figs. 3 and 4 are enlarged cross-sections on the lines 3—3 and 4—4 in Fig. 2, and Fig. 5 is a side view of the bushing member of the pilot, with parts broken away.

Referring to the drawing, 1 designates a cylinder of a radial type aeroplane engine, having the angularly disposed valve seats 2 in the head and the customary valve stem guide 3 at the outer side of each seat in axial register therewith. In the present instance, each guide is provided with a bearing sleeve 4 in which the valve stem operates. Such sleeve may, however, be omitted, as is frequently done, and the opening through the guide 3 may alone serve as the valve stem guide. It will be understood that the term "guide", as used in the description and claims, means the valve stem guide opening formed either by the guide 3 or the sleeve 4 mounted therein.

The pilot embodying the present invention comprises a stem 10, an expanding bushing 11 mounted on the stem and adapted to be inserted into the guide opening, and an adjustable nut member 12 cooperating with the outer ends of the stem 10 and bushing 11 in a manner to cause relative axial movements thereof when the member 12 is turned, as hereinafter described.

The stem 10 is of sufficient length to project at its inner end through the valve seat opening and a predetermined distance into the cylinder to be slidingly engaged by a grinding tool 5 therein, as well understood in the art, and for its outer end to project a distance without the outer end of the guide. The stem 10 intermediate its ends at the portion thereof disposed within the inner end portion of the guide is formed with an outwardly facing conical taper 13, the maximum diameter of which is of suitable size to pass through the guide opening and, in the present instance, is approximately the size of the inner end portion of the pilot stem. The outer end portion of the pilot stem, which extends from and is approximately the diameter of the small end of the taper 13, is threaded inwardly a distance from its outer end at 14.

The bushing 11 is intended to fit around the portion of the pilot stem within the guide and is longitudinally split or slotted at its inner end, as at 15, to render such end expansible, and has its bore tapered at such end for coaction with the stem taper 13. The opposite end of the bushing 11 is provided with a conical taper 16 for centering engagement with the outer end portion of the guide bore when forced therein, and is provided, without such taper, with a head 17, the outer end of which has its bore enlarged to form a socket 18. The portion of the bushing 11 outwardly from the small end of the taper 16 is of cylindrical form and of a size to substantially fit the valve stem guide opening. It is preferable, however, to reduce the diameter of the bushing intermediate its split end and the taper 16, so as to provide the bushing with axially spaced cylinder bearing portions 19.

The adjusting member 12 is of sleeve-form with its inner end threaded onto the threaded portion 14 of the pilot stem and is of suitable diameter at least at its inner end to rotatably fit into the socket 18. The member 12 is held in rotatable engagement with the bushing 11 by reason of cross-strips 20 in the wall portion of the socket 18 engaging in an annular groove 21 in said member. The socket wall is slotted to form the strips 20 and these strips are pressed into the groove. The member 12 may be provided at its rear end with a cross handle-bar 22 to facilitate turning.

In mounting the pilot in a valve stem guide, preparatory to being used as a guide means for a valve seat grinder 5, the pilot in its entire assembled form, as shown in Figs. 1 and 2, is inserted through the guide opening to position its inner end in proper guiding position within the cylinder and to fit the conical taper 16 of the bushing 11 into the outer end of the guide opening, so as to center the bushing and stem at such point in the guide. This having been done, the nut member 12 is turned relative to the bushing 11 and stem 10 to effect a threading thereof on the stem so as to draw the stem outward to force its taper 13 into the coacting inner end of the bushing 11. This action causes an expansion of the split end portion of the bushing within the guide opening to firmly center the stem in its inner end. The guide is thus firmly engaged at each end of its opening by the bushing 11 and operates to firmly hold the pilot stem in true centered relation to the guide and valve seat.

I wish it understood that my invention is not limited to any specific construction, arrangement or form of the parts, as it is capable of numerous modifications and changes without departing from the spirit of the claims.

Having thus described my invention, what I claim as new, and desire to secure by United States Letters Patent, is:

1. A pilot of the class described having a stem portion adapted to be inserted through a valve stem guide from the outer end thereof and having an outwardly facing tapered portion intermediate its ends, a bushing mounted on the stem and having its inner end portion split and in engagement with said tapered portion for expanding engagement with the inner end portion of a guide opening in which mounted, said bushing having an inwardly facing outwardly spaced conical portion for engaging within the outer end portion of a guide opening in which positioned, and means mounted on the outer end of said stem and operable to draw the stem taper into the bushing to expand its inner end.

2. A pilot of the class described comprising a valve stem adapted to be inserted into operative position through a valve stem guide opening from the outer end thereof and having an outwardly facing conical taper intermediate its ends, a bushing mounted on said stem without its taper and adapted to be inserted a predetermined distance into a guide opening with the stem and having its inner end expansible to firmly fit within the inner end portion of a guide opening and coacting with said taper, said bushing having an inwardly facing tapered portion in outwardly spaced relation to its inner end to fit into the outer end of a guide opening, and an adjusting member threaded on the outer end of said stem in thrust coaction with the outer end portion of said bushing whereby a turning of the member in one direction on the stem will draw the stem taper into the bushing to expand its inner end.

3. A pilot of the class described having a bushing for insertion into a valve stem guide opening from the outer end thereof, said bushing having an expansible inner end portion and an inwardly facing tapered portion for centering engagement within opposite end portions of a guide opening and having a socket in its outer end, a pilot stem mounted in said bushing and adapted to be inserted through a guide opening with said bushing, said stem having an outwardly facing conical portion fitting into the inner expansible end portion of the bushing, and means threaded on the outer end of the stem in coaction with the bushing and operable when turned on the stem to effect a drawing of the stem taper into the bushing.

4. A pilot of the class described having a bushing for insertion into a valve stem guide opening from the outer end thereof, said bushing having an expansible inner end portion and an inwardly facing tapered portion for centering engagement within opposite end portions of a guide opening and having a socket in its outer end, a pilot stem mounted in said bushing and adapted to be inserted through a guide opening with said bushing, said stem having an outwardly facing conical portion fitting into the inner expansible end portion of the bushing, and means threaded on the outer end of said stem and being anchored in said bushing socket to permit relative rotary movements and prevent relative axial movements thereof.

ERNEST A. HALL.